United States Patent [19]

Schützer

[11] 4,043,425
[45] Aug. 23, 1977

[54] OIL SPRAYING DEVICE

[75] Inventor: Gerhard Schützer, Stuhr-Moordeich, Germany

[73] Assignee: Gustav F. Gerdts KG, Bremen, Germany

[21] Appl. No.: 661,181

[22] Filed: Feb. 25, 1976

[30] Foreign Application Priority Data

Apr. 4, 1975 Germany .......................... 2515447

[51] Int. Cl.² ........................ F01M 1/08; F16N 7/34
[52] U.S. Cl. ................................................ 184/55 A
[58] Field of Search ..................................... 184/55 A

[56] References Cited
U.S. PATENT DOCUMENTS 2,105,492 1/1938 Gartin ................................ 184/55 A
3,301,491 1/1967 Söchting .......................... 184/55 A
3,605,949 9/1971 Vock ................................ 184/55 A
3,703,940 11/1972 Morita .............................. 184/55 A Primary Examiner—Verlin R. Pendegrass
Assistant Examiner—Thomas H. Webb
Attorney, Agent, or Firm—Allison C. Collard

[57] ABSTRACT

In an oil spraying device for the delivery of oil admixed with compressed air, a connection means is provided to connect the ends of a spring which contacts the control flap to vary the torque imparted to the control flap. For this purpose, the spring ends are loosely coupled with the control flap and the housing so that the length of the spring arms effecting control may be varied to vary its lever action. The spring is also mounted outside the pivot axis of the control flap.

8 Claims, 6 Drawing Figures

OIL SPRAYING DEVICE

This invention relates to an oil spraying device for admixing oil with compressed air.

Oil spraying devices are provided to create a fine oil mist in air compression lines to lubricate air compression devices. Throttle or control flaps may be provided in the passage line of the oil spraying means to assure that a desired admixture ratio of oil with respect to compressed air quantity exists, particularly when the flowthrough quantity of compressed air changes.

In a known embodiment of the above-mentioned type of oil spraying devices, as exemplified in West German Patent Application No. 16 01 474 laid open to public inspection, a shank spring is mounted with its associated windings on the pivot axis of a control flap and exerts an increasing locking torque on the control flap during the opening pivot movement. Therefore, the opening and closing characteristics of the control flap as well as its admixing characteristics of the oil spraying device at changing air quantities is substantially determined and can be changed only insignificantly in its structure. This is also true in view of the relatively small spring dimensions which permit only limited changes in the spring structure.

It is an object of the invention to provide an oil spraying device which has a spring mechanism with the capability of exerting a variable torque on the control flap so as to provide a wide torque range, and thereby achieve the desired admixture characteristics with respect to the changing air quantities.

In the known embodiments, the shank spring is effective with the same leverage applied to the control flap across the total pivot range, whereas in accordance with the present invention, the inventive spring arrangement makes it possible to obtain a change in the length of the effective lever arm and thereby the leverage in conjunction with the pivot movement of the control flap. This is achieved by a different correlation of the pivotal point of the bar spring on the housing with respect to the pivotal point of the flap pivot axis. Therefore, an increased or decreased effective lever length is obtainable, as well as an analogous torque during the opening movement of the control flap.

When the control flap is in its locking position, a decreasing torque is obtained due to the pivotal point which is provided on the housing in front of the flap pivot axis, and an increasing torque is obtained due to a pivotal point at the rear of the flap pivot axis. Accordingly, it is possible with the invention to provide for the influencing of the admixture characteristic of the oil spraying device with respect to the changing air quantities.

A further advantage of the invention is that the pivot angle of the shank spring amounts to only a fraction of the flap pivot angle, while in the known embodiment the pivot angle of spring and flaps are evenly dimensioned. Because of the smaller spring pivot angle, a spring may be used which has an appreciable lower amount of windings, thereby simplifying the shank spring and reduce the costs thereof. Since the spring windings are no longer mounted on the flap axis, some freedom of choice exists concerning the dimensions of the winding cross section, and it may have a longer cross section. In view of the small spring dimensions this is particularly advantageous. The particular connections of the spring ends of the spring with the control flap and the housing provides for a space saving arrangement, while providing for an especially simple and advantageous support for the spring ends.

Other objects and features of the present invention will become apparent from the following detailed description when taken in connection with the accompanying drawings which disclose the embodiments of the invention. It is to be understood, however, that the drawings are designed for the purpose of illustration only and are not intended as a definition of the invention.

In the drawings, wherein similar reference numerals denote similar elements throughout the several views.

Figure 1:
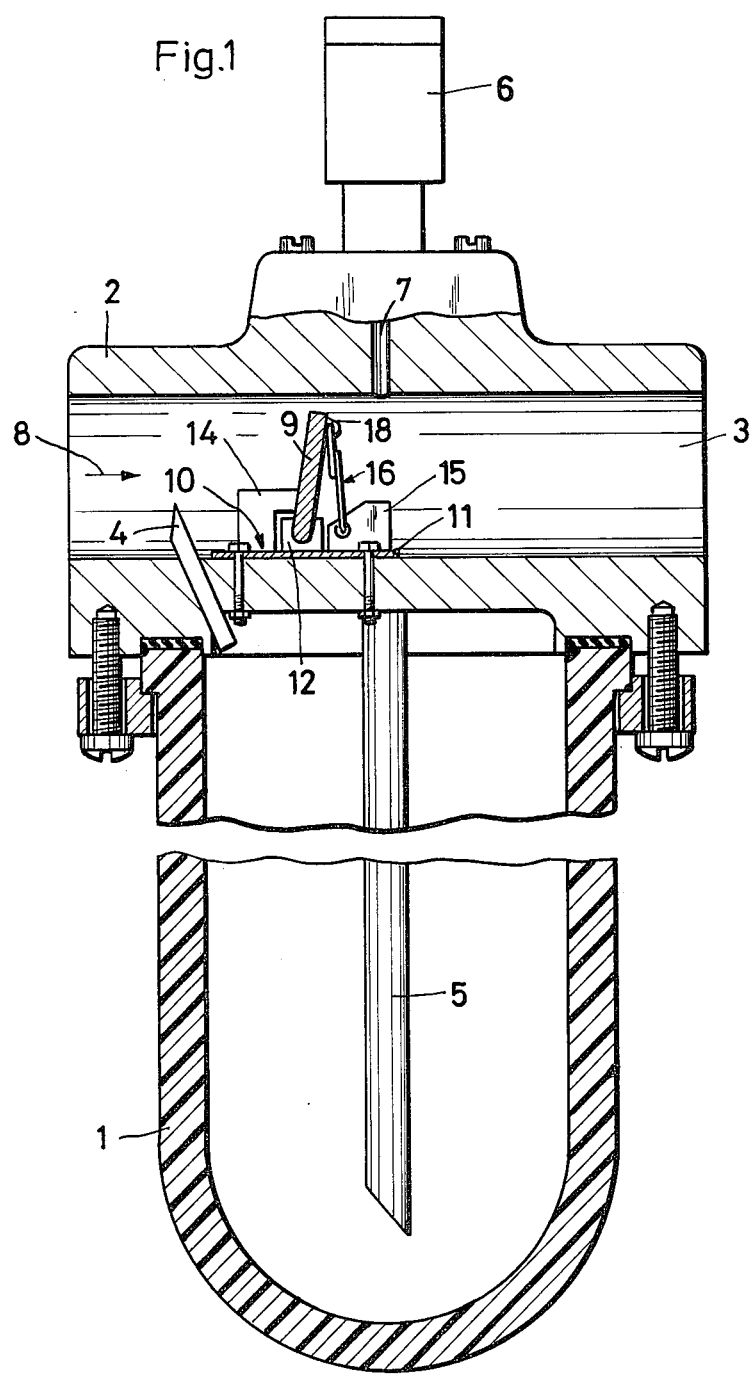
FIG. 1 is a longitudinal view partially in section of an oil spraying means with control flap in locked position.

Referring now more particularly to the drawings, in which similar characters of reference designate the same elements, the oil spraying means as shown in FIG. 1 is provided with an oil container 1 mounted on the lower side of a housing 2 which is provided with a passage line 3 for the passage of compressed air. A connecting pipe 4 leads from the passage line 3 into the oil container 1. A feed pipe 5 extends from above into oil container 1. The feed pipe extends from the oil container 1 through the housing 2 into a drip attachment 6 from which an admixture bore 7 discharges into the passage line 3. Arrow 8 indicates the direction of flow, and a control flap 9 is pivotably mounted on a pivot bearing 10 in the rear of connecting pipe 4 within passage line 3. The pivot bearing 10 consists of a stamped metal part and has a cross-shaped base form in its open or flat condition (see FIG. 4). Base member 11 is mounted to housing 2, while the lateral ends are bent upwardly (see FIG. 2) to form bearing jaws 12 to support pivot prongs 13 of the control flap, the prongs 13 forming a pivot axis for the control flap 9. In addition, the base member 11 is provided with two lateral shoulders which are bent upwardly (see FIG. 3) to form pivot limiting abutments 14, 15 for the control flap 9. The abutment 15 also functions as an abutment or spring retainer on the housing for a shank spring 16 which loads control valve 9 in the locking direction. Therefore, the shank spring 16 is pivotably mounted at its outer shank ends and includes a winding portion 17 which is provided outside the flap pivoting axis defined by prongs 13 and which is freely movable. The clamping and loading of the shank spring is accomplished only axially, i.e., in the direction of a straight line connecting point between the two spring ends. The arrangement of the shank spring 16 is particularly space saving in that the spring winding 17 and therefore the spring shanks are in a plane parallel with the pivot axis of control flap 9. In this respect, the pivot axis and the spring winding do not intersect.

Figure 5:
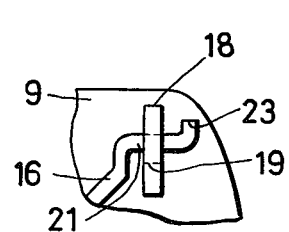
FIG. 5 is an enlarged detail view of the support for the shank spring on the control flap; and, FIG. 6 is an enlarged detail view of the support for the shank spring on the pivot bearing.
Figure 6:
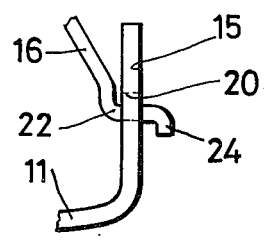

The shank spring 16 includes opposite bent or deflected ends 21, 22 which are pivotally mounted to the control flap 9 and the pivot bearing 10. The control flap 9 (see FIG. 5) is provided with a shoulder 18 having a receiving bore 19. The bent or deflected portion 21 extends axially through bore 19 and includes a bent end to form a safety shoulder 23. In a somewhat similar manner, abutment 15 (see FIG. 6) is provided with a receiving bore 20 for receiving the other bent or deflected end 22 which also includes a bent end to form a safety shoulder 24. A connecting portion being provided connecting the bent end 21 and safety shoulder 23, and the bent end 22 and the safety shoulder 24, respectively, provide for the loosely coupling the connecting portions of the shank ends with the abutment 15 and shoulder 18 in the bores 19, 20 while preventing an automatic sliding out of the spring ends from receiving bores 19, 20. The safety shoulders 23, 24 and the receiving bores are so adjusted to each other that the connecting portions connecting the bent or deflection ends 21, 22 including the safety shoulders 23, 24 can be guided through the receiving bores 19, 20 during assembly. Furthermore, the required pivotal movement of the spring shank parallel with respect to the pivot axis 20 formed by the pivot prongs 13 and the control flap 9 is provided.

When compressed air flows through passage line 3 of the oil spraying means, the control flap 9 throttles the flow of the compressed air, so that a lower pressure is provided behind the control flap 9 and in the discharge range of admixture bore 7 than in front of control flap 9. This pressure difference assures that the oil in container 1 in which the higher pressure prevails, rises through the feed pipe 5 and into the drip attachment 6 and from there it is fed through the admixture bore 7 into passage line 3 and into the stream of the flowing compressed air.

Figure 2:
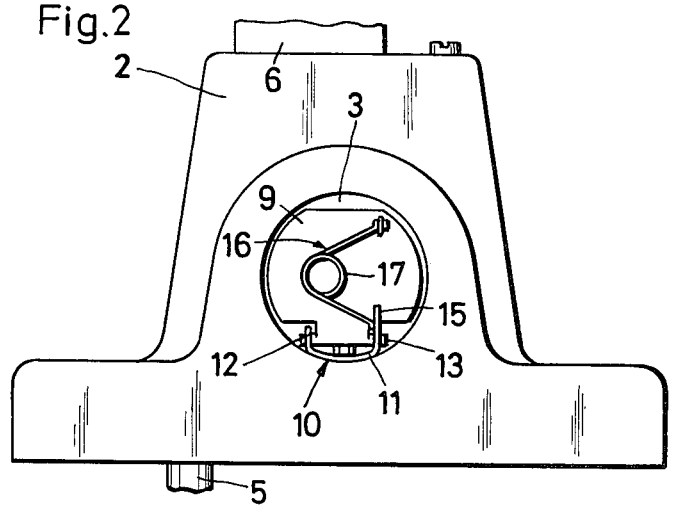
FIG. 2 is a side view of the housing of the oil spraying means with the control flap in locked position.

When only a small amount of compressed air flows through the passage line 3 of the oil spacing means, the control flap 9 is in its locking or resting position as defined by abutment 14 and substantially closes the passage line 3 (see FIGS. 1 and 2).

As soon as a stronger flow occurs, the control flap 9 is pivoted to an opening direction by the compressed air and against the force of the shank spring 16, so that a correspondingly larger cross section is provided. The increased cross section of the passage line 3 by opening control flap 9 changes in an analogous manner, but the pressure difference between the oil container 1 and the discharge range of the admixture bore 7 is also changed, so that the quantity of air and the quantity of oil which is fed into passage line 3 is changed. In this manner, a corresponding amount of lubrication oil is admixed to the compressed air and the movement of the control flap 9 is effective to vary the quantity of air and the quantity of oil fed into passage line 3.

Figure 3:
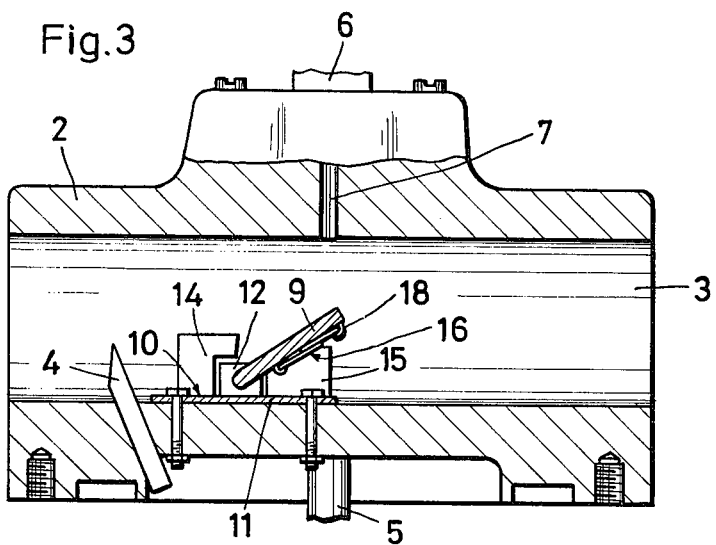
FIG. 3 is a partial longitudinal section of the housing with the control flap in open position.
Figure 4:
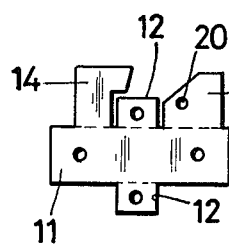
FIG. 4 is a detail view of the pivot bearing of the control flap as a stamped part before being formed.

As is clearly apparent from a comparison of FIGS. 1 and 3, together with the pivotal movement of control flap 9, the effective length of the lever arm changes so that the leverage with which the shank spring 16 acts on control flap 9 changes. This change in the effective size of the lever arm and thereby its effective lever action, whether it be an increase or a decrease, and the amount, can be controlled by the dimension of the distance of receiving bore 20 for housing bent spring end 22 with respect to the pivot axis. Therefore, it is possible to obtain an opening and closing characteristic for the control flap 9, and consequently, an admixture characteristic of the oil spraying means with a changing through flow of air quantity which corresponds to the actual requirements.

While only a preferred embodiment of the present invention has been shown and described, it will be apparent to those skilled in the art that many changes and modifications may be made thereunto without departing from the spirit and scope of the invention.

What is claimed is:

1. In an oil spraying device for the admixing oil with compressed air, said device including an oil container, a housing including an abutment, a passage line for the passage of the compressed air and a control flap including pivot prongs for pivotal support thereof in said passageway for automatically changing the free cross-sectional area of said passage line in dependence upon the pressure of the compressed air flowing therethrough, aid prongs defining a pivot axis, and a shank spring having two shank ends for loading said control flap in a locking direction, one of said shank ends being coupled with said control clap, and the other of said shank ends being coupled with said abutment, the improvement comprising:

means pivotally supporting and loosely coupling said one shank end on said control flap;

means pivotally supporting and loosely coupling said other shank end on said abutment; and said shank spring including at least one spring winding connected with each said shank ends, said at least one spring winding being mounted outside of said pivot axis and being freely movable to change the effective leverage imparted by said shank spring onto said control flap.

2. In a device as claimed in claim 1, said winding being substantially parallel with said pivot axis.

3. In a device as claimed in claim 1, each of said shank ends including a bent end, a safety shoulder and a portion connecting said end and said shoulder, a shoulder on said control flap having a receiving bore, said abutment having a receiving bore, said one shank end extending through said shoulder receiving bore with its said bent end on one side and its said safety shoulder on the other side, said other shank end extending through said abutment receiving bore with its said bent end on one side and its said safety shoulder on the other side, said connecting portions of said shank ends loosely fitting within said bores.

4. In a device as claimed in claim 3, wherein one of said pivot prongs of said control flap is pivoted to said abutment on said housing.

5. In a device as claimed in claim 4, including a pivot bearing fixed to said housing in said passage line, said pivot bearing including a stamped member comprising a base member having two lateral shoulders upwardly bent and a lateral cross-member forming upwardly bent jaws, one of said upwardly bent lateral shoulders forming said first-mentioned abutment on said housing, said upwardly bent lateral shoulders also forming pivot limiting abutments for said control flap to limit the pivotal movement thereof, and said pivot prongs being pivotally connected with said upwardly bent jaws to form therewith said pivot axis.

6. In a device as claimed in claim 1, said means pivotally supporting and loosely coupling one shoulder end on said control flap, including a shoulder on said control flap having a receiving bore, said one shoulder end including a bent end portion and a safety shoulder with an intermediate connecting portion of a diameter less than the diameter of said receiving bore, said connecting member being positioned within said receiving bore, with said safety shoulder on one side of said shoulder on said control flap and said bent end on the other side thereof to loosely couple said connecting member with said shoulder on said control flap.

7. In a device as claimed in claim 1, said means pivotally supporting and loosely coupling said other shank end on said abutment including a receiving bore in said abutment, said shank end including an inner bent end, an outer safety shoulder and a connecting portion having a diameter less than the diameter of said receiving bore forming said inner bent end with said safety shoulder and loosely fitting within said receiving bore, said safety shoulder preventing dislodgment from said abutment and said bent end providing freedom of movement to permit changing the effective length of said shank end to provide for different leverage.

8. In a device as claimed in claim 1, said spring winding comprising one winding.

* * * * *